(12) United States Patent
Caillot et al.

(10) Patent No.: US 9,714,009 B2
(45) Date of Patent: Jul. 25, 2017

(54) CONNECTOR SUPPORT AND WINDSCREEN WASHER LIQUID DISTRIBUTION DEVICE FOR MOTOR VEHICLE WINDSCREEN WIPERS

(75) Inventors: Gérald Caillot, Cernay la Ville (FR); Vincent Izabel, Chilly Mazarin (FR); Jean-Michel Jarasson, Le Mesnil-st-Denis (FR); Denis Thebault, Vanves (FR)

(73) Assignee: Valeo Systèmes d'Essuyage, Le Mesnil Saint Denis (FR)

( * ) Notice: Subject to any disclaimer, the term of this patent is extended or adjusted under 35 U.S.C. 154(b) by 356 days.

(21) Appl. No.: 14/126,993

(22) PCT Filed: May 31, 2012

(86) PCT No.: PCT/EP2012/060220
§ 371 (c)(1),
(2), (4) Date: Mar. 18, 2014

(87) PCT Pub. No.: WO2012/171804
PCT Pub. Date: Dec. 20, 2012

(65) Prior Publication Data
US 2014/0209189 A1 Jul. 31, 2014

(30) Foreign Application Priority Data
Jun. 17, 2011 (FR) ...................................... 11 55339

(51) Int. Cl.
*B60S 1/48* (2006.01)
*B60S 1/38* (2006.01)
*B60S 1/52* (2006.01)

(52) U.S. Cl.
CPC .............. *B60S 1/48* (2013.01); *B60S 1/3805* (2013.01); *B60S 1/488* (2013.01); *B60S 1/524* (2013.01); *Y10T 137/6881* (2015.04)

(58) Field of Classification Search
CPC ............ B60S 1/48; B60S 1/488; B60S 1/524; B60S 1/3805; B60S 1/52; B60S 1/522;
(Continued)

(56) References Cited

U.S. PATENT DOCUMENTS 3,888,412 A * 6/1975 Lindo ..................... B60S 1/487
137/599.14
4,074,159 A 2/1978 Robison
(Continued)

FOREIGN PATENT DOCUMENTS

DE 103 19 395 A1 11/2004
DE 20 2009 012431 U1 2/2011
(Continued)

OTHER PUBLICATIONS

International Search Report issued in PCT/EP2012/060220 mailed on Aug. 27, 2012 (4 pages).
(Continued)

*Primary Examiner* — Kevin Murphy
*Assistant Examiner* — Josephine Trinidad-Borges
(74) *Attorney, Agent, or Firm* — Osha Liang LLP (57) ABSTRACT

The present invention concerns a connector support for windscreen washer liquid distribution devices of motor vehicle windscreen wipers, including fixing means (18; 31) adapted to hold at least one check valve (7, 8), characterized in that it further includes first fixing means (19) adapted to hold removably a first electrical connector (10; 34) and second fixing means (20) adapted to hold removably a second electrical connector (11; 35), the fixing means (18; 31) for the check valve (7, 8), the first removable fixing means (19) for the first electrical connector (10; 34) and the second removable fixing means (20) for the second electrical connector (11; 35) being independent.

The invention also concerns a distribution device including such a connector support (9; 30; 40).

14 Claims, 4 Drawing Sheets (58) Field of Classification Search
CPC .... B60S 1/526; B60S 1/528; Y10T 137/6881; Y10T 137/6606; F16L 53/008; F16L 39/00
USPC ........ 137/834–841, 877–879, 881, 882, 594, 137/597; 15/250.04, 250.05, 250.06, 15/250.07; 239/284.1, 284.2; 138/106
See application file for complete search history.

(56) References Cited

U.S. PATENT DOCUMENTS

| | | | | |
|---|---|---|---|---|
| 4,360,158 A | * | 11/1982 | Bauer | B60S 1/48 239/284.1 |
| 4,815,769 A | * | 3/1989 | Hopperdietzel | B05B 1/24 138/33 |
| 4,920,602 A | * | 5/1990 | Kuehbauch | B60S 1/3415 15/250.04 |
| 5,413,139 A | * | 5/1995 | Kusumoto | F16K 49/002 137/341 |
| 5,886,448 A | | 3/1999 | Yoshida | |
| 6,060,691 A | * | 5/2000 | Minami | F16K 49/002 137/341 |
| 6,082,407 A | * | 7/2000 | Paterson | E03C 1/04 137/801 |
| 6,155,299 A | * | 12/2000 | Martin | B60S 1/52 137/846 |
| 2006/0178029 A1 | * | 8/2006 | Fabian | H01R 23/27 439/284 |
| 2007/0045447 A1 | * | 3/2007 | Wipper | B05B 9/0822 239/333 |
| 2007/0295825 A1 | * | 12/2007 | McNaughton | B60S 1/487 237/12.3 B |
| 2012/0192375 A1 | * | 8/2012 | Cathala | B60S 1/488 15/250.02 |

FOREIGN PATENT DOCUMENTS

| | | |
|---|---|---|
| EP | 0 220 955 A2 | 5/1987 |
| FR | 2 804 395 A1 | 8/2001 |
| FR | 2 950 844 A1 | 4/2011 |
| JP | S59-110351 A | 6/1984 |

OTHER PUBLICATIONS

Written Opinion of the International Searching Authority issued in PCT/EP2012/060220 mailed on Aug. 27, 2012 (5 pages).
French Search Report issued in Application No. 1154985 mailed on Feb. 10, 2012 (7 pages).

* cited by examiner

CONNECTOR SUPPORT AND WINDSCREEN WASHER LIQUID DISTRIBUTION DEVICE FOR MOTOR VEHICLE WINDSCREEN WIPERS

The present invention relates to a connector support for motor vehicle windscreen wiper windscreen washer liquid distribution devices including at least one check valve. The present invention also concerns a distribution device provided with a connector support.

Many types of windscreen wiper exist. Of these, a distinction is notably made between windscreen wipers with a single sprayer manifold (mono-manifold wipers) for distributing the windscreen washer liquid over the glass surface on one side of the wiper and windscreen wipers with two sprayer manifolds for distributing liquid on each side of the wiper according to the direction in which the wiper is moving.

The nozzles are supplied with windscreen washer liquid contained in a tank by means of a pump. To this end, an under-bonnet main pipe transports the windscreen washer liquid taken from the tank by the pump to a distribution device that in turn distributes the liquid to two windscreen wiper secondary pipes, themselves connected to the sprayer manifolds. This area in which the under-bonnet main pipe is joined to the windscreen wiper secondary pipes is used to provide check valves in the distribution device and thereby to prevent liquid returning from the windscreen wipers to the pump.

Moreover, some systems have provision for heating the windscreen washer liquid if its temperature is too low, for example below 5° C. For heating as such of the windscreen washer liquid, the network of pipes includes electrical heating wires embedded in them, for example. Thus the windscreen washer liquid is heated and routed in the pipe to the nozzle(s) without obstacles in the windscreen washer liquid circulation passage at the same time as limiting the overall size and the cost of the pipe.

One object of the present invention is to propose a distribution device that adapts easily to any windscreen wiper configuration, heated or not, with a single sprayer manifold or two sprayer manifolds.

To this end, the present invention consists in a connector support for windscreen washer liquid distribution devices of motor vehicle windscreen wipers, including fixing means adapted to hold at least one check valve, characterized in that it further includes first fixing means adapted to hold removably a first electrical connector and second fixing means adapted to hold removably a second electrical connector, the fixing means for the check valve, the first removable fixing means for the first electrical connector and the second removable fixing means for the second electrical connector being independent.

In accordance with one or more features of the connector support, separately or in combination:
the first and/or second removable fixing means function by elastic nesting,
the first and/or second removable fixing means that function by elastic nesting include at least one pair of elastic clips adapted to clip an electrical connector of complementary shape,
the first and/or second removable fixing means that function by elastic nesting are formed by at least one portion of a base of the connector support conformed to cooperate with complementary elastic clips carried by the electrical connectors,
the first and second removable fixing means are identical,
the fixing means for the check valve are adapted to hold removably at least one check valve,
the removable fixing means adapted to hold at least one check valve include a housing of substantially cylindrical general shape conformed to receive axially two check valves one above the other, the housing including a first opening conformed for the respective inlets of the check valves to pass through, a second opening conformed for the respective first outlets of the check valves to pass through, and a third opening conformed for the respective second outlets of the check valves to pass through,
the connector support includes a base including at least one pair of elastic retaining clips at the edge of the housing for clipping at least one check valve,
the walls of the housing are conformed to hold the check valves by elastic deformation,
the first and second removable fixing means respectively adapted to hold first and second electrical connectors and the fixing means adapted to hold at least one check valve are arranged on the same side of a base of the connector support,
the connector support includes a base including means for retaining it on a motor vehicle,
the retaining means include three slides arranged on the edge surface of the base for three complementary fixing clips of the motor vehicle to pass through,
the connector support is moulded in one piece from plastic material.

The invention also consists in a distribution device including
a connector support as described above,
at least one check valve fixed to the connector support, the check valve having one inlet and two outlets,
an under-bonnet main pipe including an extruded sleeve including at least one circulation passage hydraulically connected to the inlet of the check valve, and
two windscreen wiper secondary pipes including an extruded sleeve including at least one circulation passage hydraulically connected to a respective outlet of the check valve.

In accordance with one embodiment of the distribution device, the under-bonnet main pipe and the windscreen wiper secondary pipes respectively include at least two heating wires embedded in the sleeve and the distribution device includes two electrical connectors respectively held in the first and second removable fixing means of the connector support, the heating wires of the windscreen wiper secondary pipes being electrically connected in a respective electrical connector.

Thus two check valves and two electrical connectors can be fixed to the connector support. The windscreen washer liquid distribution device can then be used for windscreen wipers with two sprayer manifolds in which the pipes are heated. The connector support therefore enables hydraulic connection of the circulation passages of the under-bonnet main pipe to the circulation passages of the windscreen wiper secondary pipes via the two check valves. Also, the connector support enables electrical connection of the electrical wiring system of the motor vehicle to the heating wires of the windscreen wiper secondary pipes via the electrical connectors to heat the windscreen washer liquid.

The same connector support adapts very easily to a windscreen washer liquid distribution device for motor vehicle windscreen washers with two sprinkler manifolds with no heating. In this case, it suffices not to fix the electrical connectors into the removable fixing means of the connector support and to connect pipes with no heating wires.

Also, the same connector support adapts very easily to a windscreen washer liquid distribution device for windscreen washers with a single manifold, heated or not, including a single sprinkler manifold for distribution of the windscreen washer liquid on one side of the windscreen wiper arm. In this case, a single check valve is fixed to the connector support.

The hydraulic connection fixing means and the electrical connection fixing means are independent of each other, i.e. completely separate.

The result of this is very great flexibility for the final destination of the connector support which can therefore be adapted to different configurations of the distribution device.

The connector support is moreover robust and is therefore able to withstand the stresses associated with the requirements of motor vehicle manufacturers. Moreover, the electrical and hydraulic inputs/outputs are easily accessible. It is notably easy to obtain access to the check valve inlets/outlets to mount/demount the under-bonnet main pipe and the windscreen wiper secondary pipes.

The connector support is therefore of standard type. It incorporates a plurality of function as well as being simple to manufacture. Its modular nature enables it to be adapted to suit any type of vehicle without incurring additional costs.

Other features and advantages of the invention will emerge from the following description given by way of nonlimiting example with reference to the appended drawings, in which:

In these figures, identical elements bear the same reference numbers.

Figure 1:
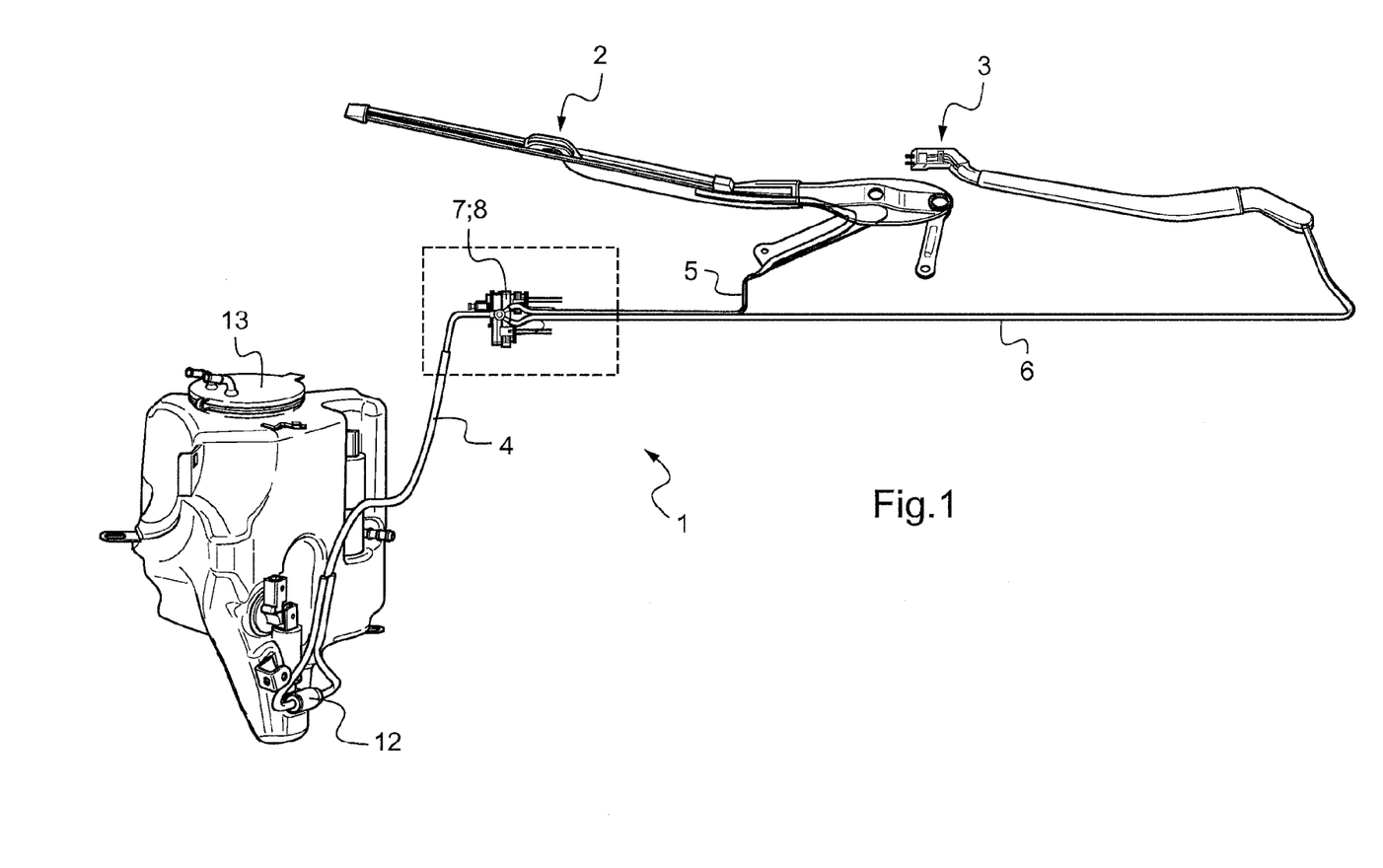
FIG. 1 represents a diagrammatic view of elements of a windscreen washer liquid distribution device for motor vehicle windscreen washers.

FIG. 1 represents a diagrammatic general view of the components of a first embodiment of a windscreen washer liquid distribution device 1 for motor vehicle windscreen washers 2, 3 with two sprinkler manifolds (only one wiper is represented in FIG. 1).

The windscreen wipers 2, 3 with two sprinkler manifolds include a sprinkler manifold provided with one or more pressurized sprayer orifices or nozzles enabling distribution of the windscreen washer liquid over the glass surface on each side of the windscreen wiper arm (not represented). The windscreen washer liquid is sent only to the front part of the wiper, i.e. the windscreen washer liquid is sent to the sprinkler manifold situated on the front side of the windscreen wiper during an upward wiping phase and on the other side during the downward wiping phase. This arrangement enables the windscreen washer liquid to be wiped immediately after it is deposited on the glass surface, thereby eliminating any time period during which vision could be reduced.

The windscreen washer liquid distribution device 1 includes an under-bonnet main pipe 4, two windscreen wiper secondary pipes 5, 6, two check valves 7, 8, a connector support 9 (FIG. 2) and two electrical connectors 10, 11.

In this first embodiment, the under-bonnet main pipe 4 and the windscreen wiper secondary pipes 5, 6 are heated to heat the windscreen washer liquid. The heated windscreen washer liquid contributes to preserving the washing function at low temperatures, protecting the structural features of the wiper and de-icing the glass surfaces.

The under-bonnet main pipe 4 is hydraulically connected on the one hand to a windscreen washer liquid pump 12 of the motor vehicle itself connected to a tank 13 and on the other hand to respective inlets of the check valves 7, 8.

The windscreen wiper secondary pipes 5, 6 are hydraulically connected on the one hand to respective outlets of the check valves 7, 8 and on the other hand to respective sprinkler manifolds of the windscreen wipers 2, 3.

Figure 2:
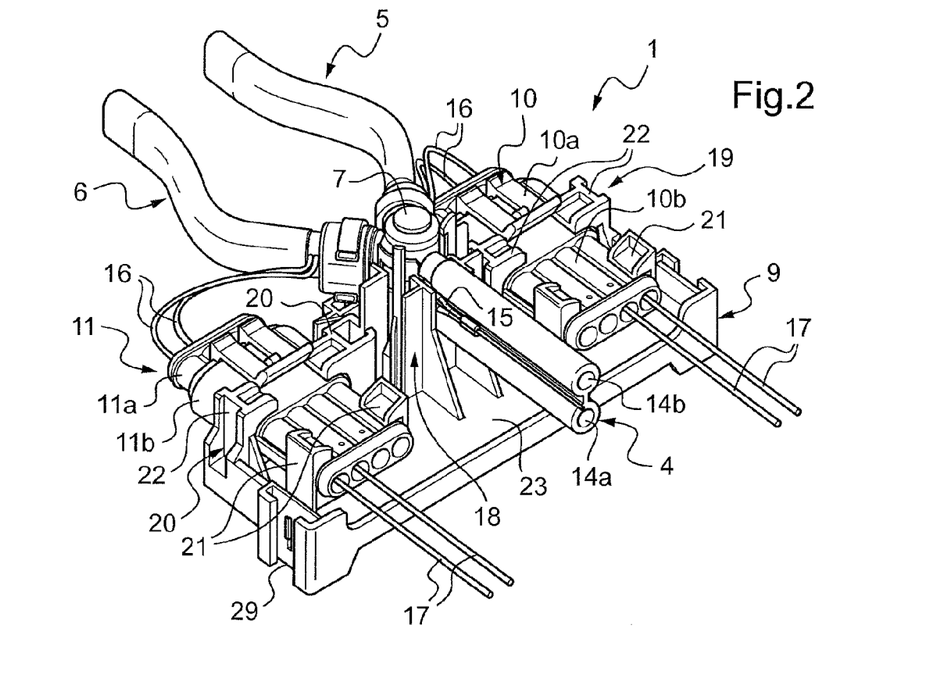
FIG. 2 represents a detail view of the portion of the distribution device inside the dashed line box in FIG. 1.
Figure 3:
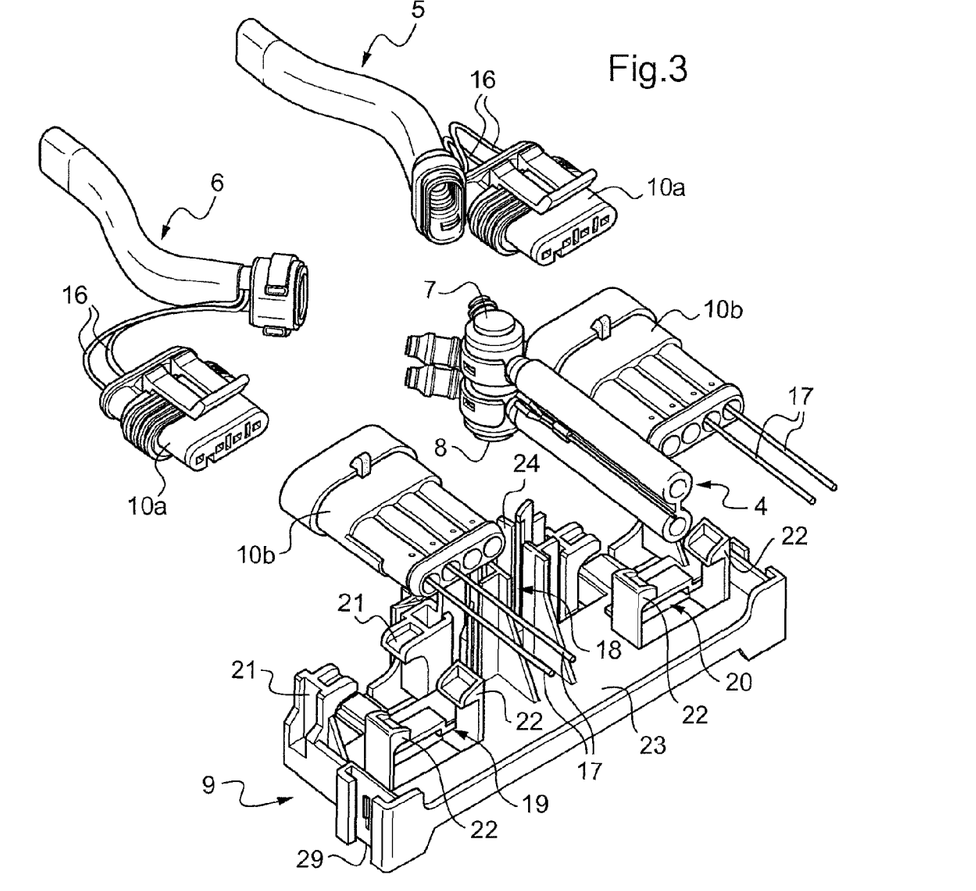
FIG. 3 represents the components of the distribution device from FIG. 2 in the dismantled state.

Seen better in FIGS. 2 and 3, which shows a sectional view of the under-bonnet main pipe 4, the under-bonnet main pipe 4 and the windscreen wiper secondary pipes 5, 6 respectively include an extruded sleeve with two circulation passages 14a, 14b and two heating wires 15, 16. The heating wires 15 of the under-bonnet main pipe 4 and the heating wires 16 of the windscreen wiper secondary pipes 5, 6 are embedded in the respective sleeve and extend out of the latter in order to be connected.

Each check valve 7, 8 has one inlet and two outlets, for example in a Y-shaped arrangement, for hydraulically connecting the circulation passages 14a, 14b of the under-bonnet main pipe 4 to the circulation passages of the windscreen wiper secondary pipes 5, 6 7 disposed on the outside of the automobile vehicle.

The check valves 7, 8 enable the pumped liquid to flow in the circulation direction from the pump 12 to the manifold and block return flow of pumped liquid in the other direction, i.e. from the wipers 2, 3 to the pump 12. The check valves 7, 8 therefore prevent liquid descending from the windscreen wipers 2, 3 toward the pump 12, notably during phases in which distribution of liquid in a circulation passage is stopped.

The check valves 7, 8 are of cylindrical general shape. They may be separate components that are assembled coaxially. They may equally be made in one piece. They may also include an adapter (not represented) in which they are accommodated.

The electrical connectors 10, 11 electrically connect the electrical power supply wires 17 of the motor vehicle to the respective heating wires 16 of the windscreen wiper secondary pipes 5, 6. The heating wires 15 of the under-bonnet main pipe 4 are for example connected together at the exit from the sleeve on the same side as the connector support 9. In the standard manner, the electrical connectors 10, 11 include a respective female connection portion 10a, 11a plugging into a complementary male connection portion 10b, 11b. The electrical connectors 10, 11 provide four connections for connecting four electrical wires, thus enabling connection of the power supply electrical wires of the heating wires of the windscreen wipers (not represented).

Figure 4:
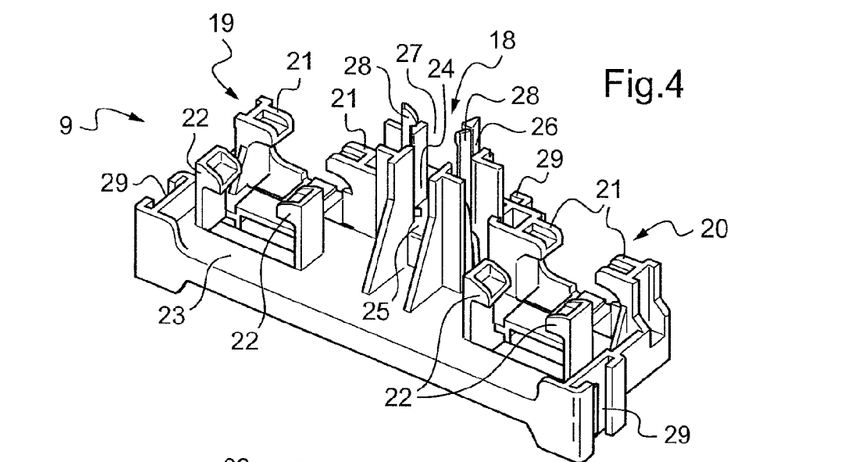
FIG. 4 represents a perspective view of a connector support.

The connector support 9 includes fixing means 18 for holding the two check valves 7, 8, first fixing means 19 adapted to hold removably the first electrical connector 10, and second fixing means 20 adapted to hold removably the second electrical connector 11.

The first and second fixing means 19, 20 are adapted to hold the respective first and second electrical connectors 10, 11 in a removable manner, i.e. the electrical connectors 10, 11 may be mounted on and demounted from the connector support 9. The fixing means 19, 20 for the electrical connectors 10, 11 and the fixing means 18 adapted to hold the two check valves 7, 8 are independent of each other. The first electrical connector 10 can therefore be fixed independently of the second electrical connector 11 and the check valves 7 and 8.

In accordance with one embodiment, the first and second removable fixing means 19, 20 are identical. The first and second removable fixing means 19, 20 function by elastic nesting, for example.

To be more specific, and as can be seen better in FIG. 4, the first and second fixing means 19, 20 that function by elastic nesting include two pairs of elastic clips 21, 22 arranged symmetrically on the base 23 of plane general shape of the connector support 9. The elastic clips 21, 22 can spread apart elastically to clip the first and second electrical connectors 10, 11 of complementary shape. For example, the male connection portion 10b, 11b is conformed to cooperate with the removable fixing means 19, 20.

Although the figures represent electrical connectors 10, 11 nesting horizontally, i.e. the connections are aligned substantially parallel to the base 23 and the elastic clips 21, 22 cooperate with the male connection portions 10b, 11b of the end connections, it is also possible to provide electrical connectors nesting vertically (not represented). The elastic clips then extend over the length of the four connections, for example. The configuration of the removable fixing means 19, 20 depends on the space available around the connector support 9.

In accordance with one embodiment, the fixing means 18 adapted to hold the check valves 7, 8 also hold the check valves in a removable manner. For example, they include a housing 24 of substantially cylindrical general shape conformed to receive the two check valves 7, 8 axially and one above the other. In FIG. 3 the check valves 7, 8 are represented in vertical alignment with the housing 24 in which they can be received. The axis of the housing 24 is substantially perpendicular to the base 23 of the connector support 9.

The housing 24 includes a first opening 25 conformed for respective inlets of the check valves 7, 8 to pass through, a second opening 26 conformed for respective first outlets of the check valves 7, 8 to pass through, and a third opening 27 conformed for respective second outlets of the check valves 7, 8 to pass through. The openings 25, 26, 27 are arranged in a Y-shape in the housing 24 like the inlets and outlets of the valves 7, 8 and extend longitudinally (perpendicularly to the base 23).

The base 23 also includes a pair of elastic retaining clips 28 symmetrically arranged at the edge of the housing 24. The elastic retaining clips 28 can spread apart elastically to clip the check valves 7, 8 of complementary shape. For example, the elastic retaining clips 28 cooperate with complementary shapes formed in an adapter accommodating the check valves 7, 8. For example, the top of the adapter includes a flange cooperating with the teeth of the elastic retaining clips 28 (not represented). In other embodiments that are not represented, the base includes retaining means cooperating with a central groove of the adapter or the base includes two pairs of elastic retaining clips arranged one above the other, each pair of elastic lugs being adapted to cooperate with a respective check valve.

The first and second removable fixing means 19, 20 for respectively holding the first and second electrical connectors 10, 11 and the fixing means 18 for holding the two check valves 7, 8 are arranged on the same side of the base 23 of the connector support 9. This arrangement facilitates access to the electrical connectors 10, 11 and to the check valves 7, 8. The first and second fixing means 19, 20 adapted to hold removably the first and second electrical connectors 10, 11, respectively, are for example arranged on either side of the fixing means 18 adapted to hold the two check valves 7, 8.

The base 23 may further include means for retaining it on a motor vehicle. For example, the retaining means include three slides 29 on the edge surface of three sides of the base 23. The slides 29 form guides for three complementary fixing clips of the motor vehicle (not represented) to pass through.

The connector support 9 including the retaining slides 28, the first and second fixing means 19, 20 adapted to hold the electrical connectors 10, 11 and the fixing means 18 adapted to hold at least one check valve 7, 8 is made in one piece by moulding a plastic material, for example.

In use, in a first direction of the windscreen wiper, the pump 12 distributes the windscreen washer liquid into the first circulation passage of the under-bonnet main pipe 4 and then into the windscreen wiper secondary pipes 5, 6 and feeds the first sprinkler manifolds of the two windscreen wipers 2, 3 with windscreen washer liquid contained in the tank 13 via the first check valve 7. The heating wires 15, 16 heat the sleeves which in turn heat the windscreen washer liquid as it flows in the circulation passages between the pump 12 and the windscreen wipers 2, 3. Similarly, in the opposite direction of the windscreen wipers 2, 3, the second circulation passage of the under-bonnet main pipe 4 feeds the second sprinkler manifolds of the two windscreen wipers 2, 3 with windscreen washer liquid via a second check valve 8 and the pump 12.

Although the connector support 9 that has just been described is suited to a distribution device in which the pipes are heated, the same connector support 9 adapts very easily to a distribution device in which only the windscreen wipers are heated. In this case, the main pipe and the secondary pipes do not include heating wires and the electrical connectors connect only the heating elements of the windscreen wipers to the electrical power supply wires.

The same connector support 9 also adapts very easily to a windscreen washer liquid distribution device for motor vehicle windscreen wipers with two unheated sprinkler manifolds. In this case, the windscreen washer liquid distribution device does not include the electrical connectors 10, 11. The under-bonnet main pipe 4 and the windscreen wiper secondary pipes 5, 6 do not include heating wires. It therefore suffices not to insert the electrical connectors 10, 11 into the elastic clips 21, 22 of the connector support 9.

Also, the connector support 9 adapts to a windscreen washer liquid distribution device for single-manifold windscreen wipers, heated or not, having a single sprinkler manifold for distributing the windscreen washer liquid on one side of the windscreen wiper arm (not represented).

In this case, in addition to the connector support 9, the windscreen washer liquid distribution device includes an under-bonnet main pipe 4 and two windscreen wiper secondary pipes 5, 6, a single check valve 7 and two electrical connectors 10, 11 if the windscreen wipers and/or the pipes are heated.

The under-bonnet main pipe 4 and the windscreen wiper secondary pipes 5, 6 respectively include an extruded sleeve with two circulation passages one of which is "blocked" or not pierced so as to be inactive.

In use, the pump 12 distributes the windscreen washer liquid into the circulation passage of the under-bonnet main pipe 4 and then into the circulation passages of the windscreen wiper secondary pipes 5, 6 to feed the sprayer manifolds of the windscreen wipers.

The adapter then accommodates a single check valve and is conformed to cooperate with the elastic retaining clips 28 of the connector support 9 to clip on the check valve, for example. It therefore suffices not to accommodate a second check valve in the adapter received in the housing 24.

Figure 5A:
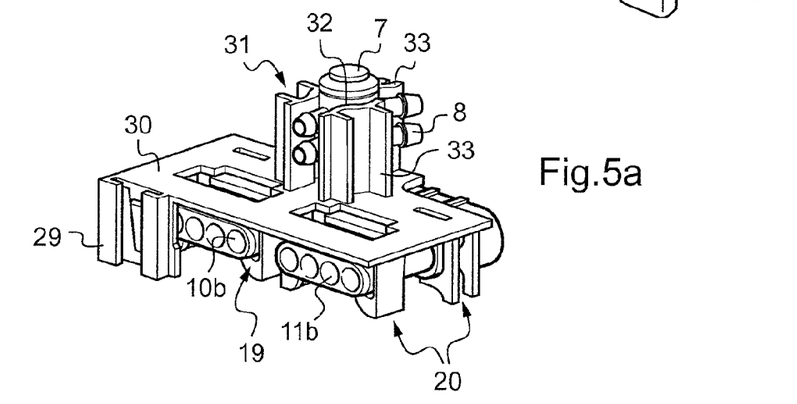
FIG. 5a represents a diagrammatic perspective view of a connector support in accordance with a second embodiment assembled to two electrical connectors and two check valves.
Figure 5B:
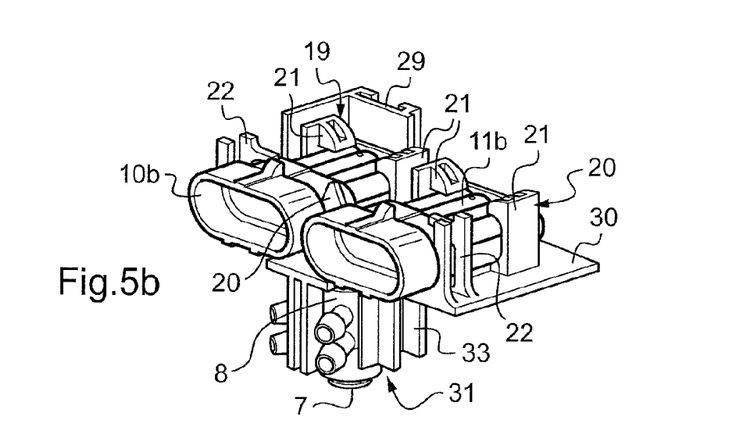
FIG. 5b represents a view of the underside of the components from FIG. 5a, and FIG. 6 represents a diagrammatic view of components of a third embodiment of a windscreen washer liquid distribution device for motor vehicle windscreen washers.

FIGS. 5a and 5b represent a second embodiment of a connector support 30 for a windscreen washer liquid distribution device for motor vehicle windscreen wipers having two sprinkler manifolds with an under-bonnet main pipe and windscreen wiper secondary pipes heated to heat the windscreen washer liquid.

In this second embodiment, the first and second fixing means 19, 20 respectively adapted to hold removably the first and second electrical connectors 10, 11 and the fixing means 31 adapted to hold the two check valves 7, 8 are arranged on opposite sides of the base of the connector support 30. The first and second fixing means 19, 20 adapted to hold removably the first and second electrical connectors 10, 11, respectively, are for example arranged side by side.

Furthermore, the fixing means 31 adapted to hold the check valves 7, 8 include a housing 32 of substantially cylindrical general shape the walls 33 of which are conformed to hold the two check valves 7, 8 by elastic deformation.

Figure 6:
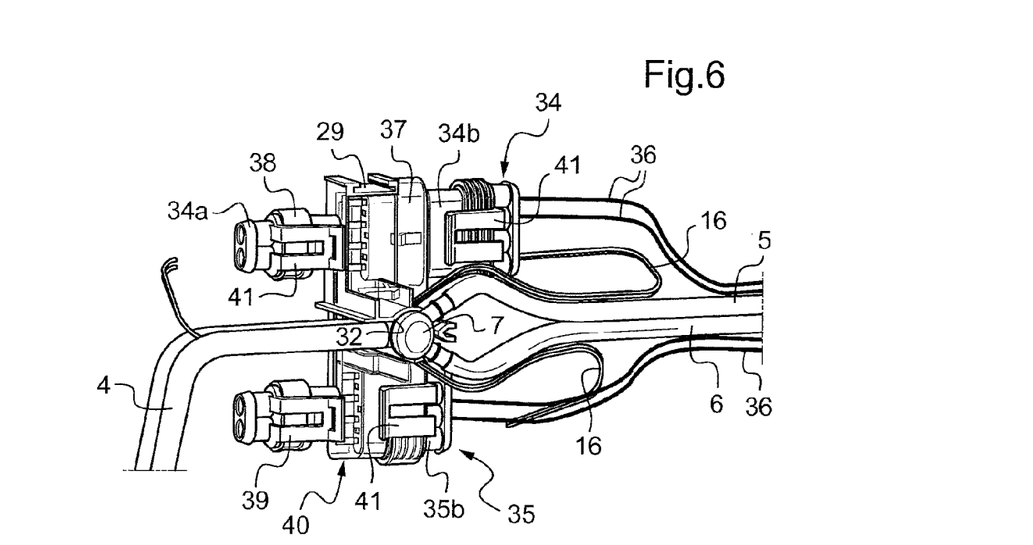

FIG. 6 represents a third embodiment of a connector support 40 for a windscreen washer liquid distribution device for motor vehicle windscreen wipers with two sprinkler manifolds in which the under-bonnet main pipe 4 and the windscreen wiper secondary pipes 5, 6 are heated.

In this third embodiment, the electrical connectors 34, 35 have two male connection portions 34a, 34b, 35a, 35b that are electrically connected to each other. The electrical connectors 34, 35 are thus able to connect the electrical power supply wires of the motor vehicle to the heating wires 16 of the secondary pipes of the respective windscreen wipers 5, 6 and additional electrical wires 36 that follow the secondary pipes of the windscreen wipers 5, 6 to feed heating elements in the windscreen wipers.

Moreover, the first and second means for fixing the electrical connectors 34, 35 that function by elastic nesting are formed by portions 37, 38 of the edge surface of the base 39 of the connector support 40 which are conformed to cooperate with the electrical connectors 34, 35.

To be more specific, the first and second conformed portions 37, 38 form female connecting portions surrounded by a respective flange. The female connection portions cooperate with the male connection portions 34a, 34b, 35a, 35b and the flanges cooperate with complementary elastic clips 41 carried by the respective male connection portions 34a, 34b, 35b, 35b of the electrical connectors 34, 35 (the interior of the connector support 40 is represented in FIG. 6 as if it were transparent).

In this third embodiment, the housing 32 is on one side of the base 39 and the means for removably fixing the electrical connectors 34, 35 are in the edge surface of the base 39. This arrangement enables insertion of the male connection portions 34a, 34b, 35b, 35b into the connector support 40.

The invention claimed is:

1. A connector support for windscreen washer liquid distribution devices of motor vehicle windscreen wipers, comprising:
   fixing means that holds at least one check valve;
   a first removable fixing means that removably holds a first electrical connector; and
   a second removable fixing means that removably holds a second electrical connector,
   wherein the fixing means for the check valve, the first removable fixing means for the first electrical connector, and the second removable fixing means for the second electrical connector are independent,
   wherein the connector support connects at least one of the motor vehicle windscreen wipers to a windscreen washer liquid pump,
   wherein at least one of the first removable fixing means, and the second removable fixing means functions by elastic nesting, and
   wherein the first electrical connector and the second electrical connector each comprise a female connection portion and a complementary male connection portion that is plugged into the female connection portion.

2. The connector support according to claim 1, wherein the first and/or second removable fixing means that function by elastic nesting include at least one pair of elastic clips adapted to clip the first and/or second electrical connectors of complementary shape.

3. The connector support according to claim 1, wherein the first and/or second removable fixing means that function by elastic nesting are formed by at least one portion of a base of the connector support conformed to cooperate with complementary elastic clips carried by the electrical connectors.

4. The connector support according to claim 1, wherein the first and second removable fixing means are identical.

5. The connector support according to claim 1, wherein the fixing means removably holds the at least one check valve.

6. The connector support according to claim 5, wherein the fixing means include a housing of substantially cylindrical general shape conformed to receive axially two check valves one above the other, the housing including a first opening conformed for the respective inlets of the check valves to pass through, a second opening conformed for the respective first outlets of the check valves to pass through, and a third opening conformed for the respective second outlets of the check valves to pass through.

7. The connector support according to claim 6, wherein walls of the housing are conformed to hold the check valves by elastic deformation.

8. The connector support according to claim 1, wherein the first and second removable fixing means respectively adapted to hold first and second electrical connectors and the fixing means adapted to hold at least one check valve are arranged on the same side of a base of the connector support.

9. The connector support according to claim 1, further comprising a base that includes retaining means that retains the base on a motor vehicle.

10. The connector support according to claim 9, the retaining means include three slides arranged on an edge surface of the base for three complementary fixing clips of the motor vehicle to pass through.

11. The connector support according to claim 1, wherein the connector support is moulded in one piece from plastic material.

12. A distribution device comprising:
a connector support according to claim 1;
at least one check valve fixed to the connector support, the check valve having one inlet and two outlets;
an under-bonnet main pipe including an extruded sleeve including at least one circulation passage hydraulically connected to the inlet of the check valve; and
two windscreen wiper secondary pipes including an extruded sleeve including at least one circulation passage hydraulically connected to a respective outlet of the check valve.

13. The distribution device according to claim 12, wherein the under-bonnet main pipe and the windscreen wiper secondary pipes respectively include at least two heating wires embedded in the sleeve and in that the distribution device includes two electrical connectors respectively held in the first and second removable fixing means of the connector support, the heating wires of the windscreen wiper secondary pipes being electrically connected in a respective electrical connector.

14. A connector support for windscreen washer liquid distribution devices of motor vehicle windscreen wipers, comprising
fixing means that removably holds at least one check valve;
a first removable fixing means that removably holds a first electrical connector; and
a second removable fixing means that removably holds a second electrical connector,
wherein the fixing means for the check valve, the first removable fixing means for the first electrical connector and the second removable fixing means for the second electrical connector are independent,
wherein the fixing means include a housing of substantially cylindrical general shape conformed to receive axially two check valves one above the other, the housing including a first opening conformed for the respective inlets of the check valves to pass through, a second opening conformed for the respective first outlets of the check valves to pass through, and a third opening conformed for the respective second outlets of the check valves to pass through, and
wherein the connector support further comprises a base including at least one pair of elastic retaining clips at the edge of the housing for clipping at least one check valve.

* * * * *